US012261035B2

(12) United States Patent
Baum et al.

(10) Patent No.: US 12,261,035 B2
(45) Date of Patent: Mar. 25, 2025

(54) HIGH-PRESSURE DISCHARGE LAMP, IN PARTICULAR HIGH-PRESSURE SODIUM-VAPOR LAMP, WITH IMPROVED IGNITABILITY

(71) Applicant: USHIO GERMANY GMBH, Steinhoering (DE)

(72) Inventors: Thorsten Baum, Steinhoering (DE); Marcin Piotrowsky, Blonie (PL)

(73) Assignee: Ushio Germany GmbH, Steinhoering (DE)

(*) Notice: Subject to any disclaimer, the term of this patent is extended or adjusted under 35 U.S.C. 154(b) by 317 days.

(21) Appl. No.: 17/808,686

(22) Filed: Jun. 24, 2022

(65) Prior Publication Data

US 2022/0415642 A1 Dec. 29, 2022

(30) Foreign Application Priority Data

Jun. 28, 2021 (DE) ..................... 10 2021 206 702.6

(51) Int. Cl.
*H01J 61/073* (2006.01)
*H01J 61/30* (2006.01)

(52) U.S. Cl.
CPC .......... *H01J 61/073* (2013.01); *H01J 61/302* (2013.01)

(58) Field of Classification Search
CPC ...... H01J 61/073; H01J 61/302; H01J 61/547; H01J 61/825; H01J 61/0732
See application file for complete search history.

(56) References Cited

U.S. PATENT DOCUMENTS 4,559,472 A * 12/1985 Triebel ................ H01J 61/0732 313/631
9,137,881 B2 9/2015 Yamada et al.
10,074,532 B1 * 9/2018 Ota ....................... H01J 61/366
(Continued)

FOREIGN PATENT DOCUMENTS

DE 29722583 3/1998
EP 0915496 5/1999
(Continued)

*Primary Examiner* — Alexander H Taningco
*Assistant Examiner* — Pedro C Fernandez
(74) *Attorney, Agent, or Firm* — Grossman, Tucker, Perreault & Pfleger, PLLC

(57) ABSTRACT

A high-pressure discharge lamp with a burner unit which has a discharge vessel which encloses a discharge space and in which two electrodes are arranged opposite one another, wherein the electrodes each have an electrode support and an electrode tip, wherein the electrode tips are located opposite one another to form an electric arc during operation of the high-pressure discharge lamp, wherein at least a first one of the electrodes is configured as a coil electrode which has an electrode support and an electrode coil formed by a wire wound around the electrode support, wherein an exposed end of the electrode support forms the electrode tip, and wherein the electrode coil is arranged in a tip region of the electrode support adjacent to the electrode tip in the discharge space, and wherein an antenna to which voltage can be applied is routed along an outer surface of the discharge vessel. The electrode coil of the first electrode has a protrusion that protrudes beyond the outer circumference of the electrode coil toward the antenna.

12 Claims, 5 Drawing Sheets

(56) References Cited

U.S. PATENT DOCUMENTS

| | | | | |
|---|---|---|---|---|
| 2009/0040478 | A1* | 2/2009 | Yamauchi | G03B 21/2026 313/631 |
| 2014/0125223 | A1* | 5/2014 | Magg | H01J 61/86 313/631 |

FOREIGN PATENT DOCUMENTS

| | | |
|---|---|---|
| EP | 2301063 | 10/2013 |
| JP | 2012160306 | 8/2012 |

* cited by examiner

HIGH-PRESSURE DISCHARGE LAMP, IN PARTICULAR HIGH-PRESSURE SODIUM-VAPOR LAMP, WITH IMPROVED IGNITABILITY

FIELD

The invention relates to a high-pressure discharge lamp, in particular a high-pressure sodium-vapor discharge lamp, with improved ignitability.

BACKGROUND

Generic high-pressure discharge lamps (or high intensity discharge lamps, HID) are used for a wide variety of applications, such as outdoor lighting or projectors. Moreover, they are also used in horticulture for plant lighting, for example, lighting greenhouses. They typically feature a burner unit with a discharge vessel enclosing a discharge space. In this discharge vessel, two electrodes are arranged opposite each other, each electrode having an electrode support with an electrode tip. At least one of the electrodes, for example a first electrode, has, in a tip region adjacent to the electrode tip in the discharge space, an electrode coil comprising a wire wound around the electrode support.

Enclosed in the discharge space of the discharge vessel is an ionizable lamp filling containing various fillers, which generates radiation at specific wavelengths when excited. Typical fillers are selected from mercury, compounds of other metals, especially metal halides, and noble gases. By suitable selection of the type and quantity of fillers, the high-pressure discharge lamps emit radiation with a desired wavelength or with desired wavelength ranges. In this manner, the lamps can be optimized for different applications. In horticulture, for example, it is advantageous to use high-pressure sodium-vapor discharge lamps, which contain sodium, mercury and noble gases such as xenon as fillers, and possibly other metals such as thallium, indium, scandium, rare earths or their compounds. Such lamps emit particularly intense radiation in wavelength ranges that can be used for photosynthesis by plants, i.e. in particular in a wavelength range from 380 nm to 780 nm. The number of photons emitted per unit of time that are within this wavelength range usable for photosynthesis is indicated via the so-called PAR (photosynthetically active radiation) value.

Especially in horticulture, high PAR values are desired, since a more intense lighting of the plants produces a higher yield. It is therefore desired to provide high-pressure discharge lamps with a highest possible PAR value. However, it is problematic that for this purpose it is necessary to increase the gas filling pressure in the discharge vessel. However, an increased gas filling pressure in the discharge vessel makes it more difficult to ignite the lamp, i.e., to form the arc between the electrodes that is necessary for a continuous arc discharge. To be able to ignite despite the higher gas filling pressure, high-pressure discharge lamps require higher ignition voltages. The disadvantage here is that higher ignition voltages cannot be provided by standard lamp sockets and ballasts. These are typically configured for an ignition voltage of approx. 3.5 kV. If special equipment or custom designs are required for the use of the high-pressure discharge lamp to go beyond 3.5 kV, this drives up the cost of using such a lamp and makes it unattractive to the customer. There is therefore a technical need to improve the ignitability of high-pressure discharge lamps so that they can be used with conventional lamp sockets and ballasts at the usual ignition voltage.

For example, a conventional generation of generic high-pressure discharge lamps had a PAR value of 1950 μmol/s, at a gas filling pressure of 350 mbar. Without any supporting measures, these lamps already exhibited excellent ignitability and ignited perfectly. In another generation of high-pressure discharge lamps, PAR values of 2100 μmol/s or even 2150 μmol/s were achieved. For this purpose, the gas filling pressure had to be increased to about 520 mbar, which meant that these lamps no longer ignited without further ado. Various techniques have therefore been developed to improve the ignitability of the lamps. For example, generic high-pressure discharge lamps may include an antenna routed along an outer surface of the discharge vessel, to which a voltage may be applied and which is typically made of a conductive material and reduces the required ignition voltage of the lamp. The antenna may be in the form of a wire or an ignition strip applied to the discharge vessel. The antenna may be an active or a passive antenna. An active antenna is electrically connected to an electrode of the lamp, while there is no direct electrical connection between a passive antenna and the electrodes. A passive antenna may, for example, be capacitively connected to the ignition voltage, as described in EP 2 301 063 B1 for a so-called hybrid antenna. Another way to reduce the ignition voltage is to use a capacitor unit, for example a triple capacitor such as the "Triple Capacitor" developed by the applicant.

To further increase the PAR value to over 2150 μmol/s, such as to 2180 μmol/s or more, an even higher gas filling pressure would be required, for example of at least 800 mbar. However, tests by the applicant have shown that previously known configurations of high-pressure discharge lamps then no longer ignite reliably, or not at all. With conventional high-pressure discharge lamps, an even further increase in PAR value and an increase in yield in horticulture brought about by their use thus seemed impossible, although this would be desirable.

SUMMARY

Against this background, it is the object of the present invention to provide a high-pressure discharge lamp with improved ignitability. In particular, the high-pressure discharge lamp should be operable without major structural modifications, and especially with conventional lamp sockets and ballasts. In addition, the high-pressure discharge lamp should function reliably at the highest possible PAR value and, in particular, ignite reliably.

The object is achieved with a high-pressure discharge lamp with a burner unit which has a discharge vessel which encloses a discharge space and in which two electrodes are arranged opposite one another, wherein the electrodes each have an electrode support and an electrode tip, wherein the electrode tips are located opposite one another to form an electric arc during operation of the high-pressure discharge lamp, wherein at least a first one of the electrodes is configured as a coil electrode which has an electrode support and an electrode coil formed by a wire wound around the electrode support, wherein an exposed end of the electrode support forms the electrode tip, and wherein the electrode coil is arranged in a tip region of the electrode support adjacent to the electrode tip in the discharge space, and wherein an antenna to which voltage can be applied is routed along an outer surface of the discharge vessel. The electrode coil of the first electrode has a protrusion that protrudes beyond the outer circumference of the electrode coil toward the antenna. Preferred embodiments are cited in the dependent claims.

More specifically, with a generic high-pressure discharge lamp as mentioned at the beginning (hereinafter also referred to simply as "lamp"), the object is achieved in that the first electrode has a protrusion which protrudes beyond the outer circumference of the electrode coil toward the antenna. The protrusion according to the invention thus protrudes beyond the electrode and thus also beyond the electrode coil of the electrode. This does not necessarily mean that the protrusion must start from the outer circumference of the electrode coil. Rather, the invention also comprises the protrusion being adjacent to the electrode coil in the direction of longitudinal extent of the electrode support and having a greater length than the extent of the electrode coil in a radial direction such that it protrudes beyond the outer circumference of the electrode coil. The protrusion extends at least partially in a lateral direction (i.e., outward from an inner region of the discharge vessel of the burner unit toward its inner wall). The protrusion according to the invention reduces or partially bridges the distance between the electrode and the antenna. To be effective, the protrusion must be of appreciable length. Therefore, a protrusion in the sense of the invention does not include surface irregularities of the electrode and especially of the electrode coil. Accordingly, the length with which the protrusion protrudes beyond the outer circumference of the electrode coil is advantageously at least half the thickness of the electrode coil in a radial direction originating from the longitudinal axis of the electrode support, and preferably at least the thickness of the electrode coil. Alternatively, the protrusion advantageously protrudes by at least half the diameter, preferably at least the diameter, of the wire from which the electrode coil is formed. By reducing the distance between the electrode and the antenna, electrons can cross more easily, which facilitates voltage breakdown between the electrodes and greatly improves the ignitability of the high-pressure discharge lamp. Thus, the high ignition voltage required at high gas filling pressures can be reduced such that it is in a range that can be provided with conventional lamp sockets and ballasts. In this manner, the invention allows the gas filling pressure to be increased, which in turn increases the PAR value of the lamp. Apart from the protrusion of the first electrode, the high-pressure discharge lamp according to the invention is completely similar to corresponding prior art lamps. This means that in the manufacture and use of the lamp according to the invention, recourse can be made quite predominantly to prior art components and processes, so that minimal additional costs and practically no additional effort are incurred. More specifically, this means that—apart from the protrusion of the first electrode—the high-pressure discharge lamps of the present invention basically correspond to the prior art in all features, for example their basic structure, lamp filling, shape, electrode arrangement and material, etc. These properties of the high-pressure discharge lamp according to the invention therefore need not be discussed in further detail here. Where such properties are discussed, the description is therefore only exemplary and serves to explain the configuration and function of the electrode protrusion.

Generally, the invention may be applied to any high-pressure discharge lamps having an antenna, even at lower gas filling pressures than the problematic range mentioned at the beginning, and may help to improve their ignitability. Examples of high-pressure discharge lamps are selected from the group consisting of a metal halide lamp and a high-pressure sodium-vapor lamp, in particular a high-pressure sodium-vapor lamp with a gas filling pressure of more than 360 mbar, a high-pressure sodium-vapor lamp with a gas filling pressure of more than 470 mbar, a high-pressure sodium-vapor lamp with a gas filling pressure of more than 580 mbar, a high-pressure sodium-vapor lamp with a gas filling pressure of more than 700 mbar, and a high-pressure sodium-vapor lamp with a gas filling pressure of 580 mbar to 850 mbar. Particularly preferred is a high-pressure sodium-vapor discharge lamp for plant lighting.

According to the independent claim, the protrusion according to the invention is used on the first electrode. However, in order to standardize production and simplify handling, both electrodes may have the protrusion. Advantageously, the first electrode is the one that is connected to the neutral conductor of the ballast, and the second electrode is preferably the one to which the ignition voltage is applied. As mentioned, the protrusion according to the invention serves to shorten the distance between the first electrode and the antenna to lower the ignition voltage. Advantageously, the protrusion is thus electrically conductive, i.e. contains an electrically conductive material or is made entirely of such a material. Preferably, the material is the same as the material used for the electrode and/or the electrode coil. A typical material is a refractory metal such as tungsten or thoriated tungsten.

According to the invention, the high-pressure discharge lamp has two electrodes, each having an electrode support with an electrode tip. The electrode tips are located opposite one another in the discharge space such that an electric arc can form between them during operation of the high-pressure discharge lamp. At least a first one of the electrodes is configured as a coil electrode in a manner known per se. Accordingly, an electrode coil formed by a wire wound around the electrode support is attached in a tip region adjacent to the electrode tip. In the present context, "wound around the electrode support" does not necessarily mean that the electrode coil must be wound around the electrode support during its manufacture. Instead, the electrode coil may also be wound independently of the electrode support and then slid onto the electrode support. Preferably, the coil electrode consists only of the electrode support and the electrode coil. The electrode tip of the at least one coil electrode—at which the arc attaches during operation of the lamp—is formed by the exposed end of the electrode support projecting into the discharge space. The electrode tip is thus part of the electrode support and integral with it. Accordingly, the coil electrode does not have a separate electrode body attached to the tip of the electrode support and projecting from the tip of the electrode support toward the opposite electrode. In the coil electrode, the front end of the electrode coil located toward the electrode tip is usually spaced apart from the electrode tip, i.e. is slightly set back relative to the tip. This end region of the electrode support, where the latter is exposed and not surrounded by an electrode coil, is referred to as "free tip region". The "free tip region" is a subregion of the tip region in which the electrode coil is attached. The tip region of the electrode support extends from the electrode tip to a middle region of the electrode support, and ends at a distance from the rear end region of the electrode support with which the latter is held in a sealing region of the discharge vessel. The electrode support is held at the discharge vessel in a manner known in the prior art, for example by attaching the rear end of the electrode support to a niobium cap and soldering the cap to the tube of the discharge vessel. The length of the tip region may be, for example, 10 to 80%, preferably 20 to 75%, particularly preferably 25 to 70%, and especially 30 to 60% of the total length of the electrode support. The electrode coil and the protrusion of the first electrode are located in this tip region.

Generally, the shape of the protrusion is not limited in a particular manner, as long as it is suitable to lead to a reduction in the ignition voltage of the lamp and, in particular, to ensure electron transfer between the protrusion and the antenna. This can be achieved particularly easily if the protrusion extends such that it is concentrated toward the antenna. Preferably, therefore, the protrusion is rod-shaped or strip-shaped and/or tapered toward the antenna. Generally, the protrusion may be located at any point along the tip region of the electrode support rod. However, if the protrusion is too close to the tip of the electrode support, the protrusion may interfere with the formation of a stable electric arc, which in turn may cause the lamp to flicker during operation. For this reason, according to the invention, it is preferred to arrange the protrusion in a region in which it does not interfere with the formation of a stable arc discharge during lamp operation. Thus, the protrusion according to the invention performs its function only during ignition of the lamp, while it no longer has any function during normal lighting operation and, in particular, does not serve as a starting point for the arc. Particularly preferably, therefore, the protrusion is set back as seen from the electrode tip and, in particular, is arranged in a rear end region of the electrode coil facing away from the electrode tip, or in the immediate vicinity behind the electrode coil as seen from the electrode tip. In relation to the overall length of the electrode coil in the direction of longitudinal extent of the electrode support, the protrusion is preferably located in the rear half of the electrode coil as seen from the electrode tip, and particularly preferably in its rear third. Specifically, a distance between the protrusion and the electrode tip in the direction of the electrode support is, for example, at least 2 mm, and preferably at least 4 mm. The measurements in this case refer to the length along the electrode support between the electrode tip and a projection of the point of the protrusion closest to the electrode tip onto the electrode support.

As already mentioned, the protrusion does not necessarily have to extend from the electrode coil, but may be arranged adjacent, and advantageously immediately adjacent, to the electrode coil. Accordingly, in one embodiment of the invention, the protrusion may be formed as a separate part from the electrode coil. This separate part may be attached to the electrode support, for example, by soldering or welding. It is also possible to form the protrusion on the electrode support during its manufacture, so that the protrusion is preferably integral with the electrode support. Preferably, the protrusion is rod-shaped or strip-shaped and protrudes radially from the electrode support.

In another variation of the invention, which is currently the preferred one according to the invention, the protrusion is formed as part of the electrode coil. It is particularly preferred that the protrusion is formed from a section of the wire of the electrode coil and is thus in particular integral with the electrode coil. Generally, it is possible to form the protrusion from an end section of the coil wire or from a central section of the coil wire located between the end sections. In both cases, the length of wire from which the protrusion is formed is not wound around the electrode support like the other sections of the coil wire, but is bent outward such that it protrudes beyond the outer circumference of the electrode coil. In the former case, an end section of the wire located in the rear region of the electrode coil away from the electrode tip is advantageously used to form the protrusion. Accordingly, the protrusion protrudes beyond the outer circumference of the electrode coil in its rear region, which has the aforementioned advantage that the protrusion does not interfere with the formation of a stable electric arc during lighting operation.

In the prior art, it is common practice to wind electrode coils in multiple layers in at least some regions, so that the electrode coil has an inner coil layer and an outer coil layer and, in exceptional cases, even more than two coil layers. Preferably, all coil layers are wound from a continuous wire, i.e. are integral. Coil layers directly above one another are preferably wound with different, i.e. opposite, directions of rotation. Typically, the inner coil layer is wound from the rear end of the coil toward the electrode tip, and then the outer coil layer is wound back from the electrode tip onto the inner coil layer. In the finished electrode coil, the end sections of the coil wire are therefore both located in the rear region of the electrode coil facing away from the electrode tip, and thus on the side preferred for the formation of the protrusion. Generally, either of these end sections may be used to form the protrusion; theoretically, both end sections could be used together, although this is not preferred. The easiest way to create the protrusion is to bend the end section of the outer coil layer toward the antenna. Instead of an end section of the wire, the protrusion also be formed from a middle region of the coil wire. In this case, the protrusion is preferably configured as a wire loop. For this purpose, a part of the wire of the electrode coil is not routed directly along the electrode support or a deeper coil layer, but is first routed away from the electrode support, then bent over and routed back to the electrode support. After the wire loop, the wire may then again be wound as an electrode coil.

As already described, the purpose of the protrusion is to reduce the distance between the electrode or electrode coil and the antenna as much as possible in order to facilitate the escape of electrons and to reduce the ignition voltage. This is easier the closer the free end of the protrusion is to the antenna. Since the antenna is located on the outer surface of the discharge vessel whereas the protrusion is located inside the discharge vessel, a minimum distance between the protrusion and the antenna is achieved by bringing the free end of the protrusion as close as possible to the inner surface of the discharge vessel in a region opposite the antenna. To avoid damage to the discharge vessel, the protrusion should not touch the discharge vessel and should keep at least a small distance from the inner surface of the discharge vessel. The distance between the antenna and the free end of the protrusion is thus essentially determined by the wall thickness of the discharge vessel and is, at a closest possible approach, only slightly greater than said thickness. The length required for the protrusion to meet these requirements depends largely on the type of high-pressure discharge lamp and its dimensions. For the burner unit of a common high-pressure sodium-vapor discharge lamp, exemplary lengths by which the protrusion protrudes beyond the outer circumference of the electrode coil are in the range of 0.5 mm to 1.8 mm, preferably 0.8 mm to 1.5 mm, and in particular 1 mm to 1.3 mm.

The antenna is basically configured as common in the prior art and consists of a conductive material, such as a metal wire. Alternatively, an ignition strip of conductive material may be applied to the outer surface of the discharge vessel of the burner unit. In the latter case, the antenna is thus integrated into the discharge vessel. The antenna extends across at least a subregion along the outer surface of the discharge vessel, in particular in the longitudinal direction of the lamp from the first to the second electrode, and preferably essentially completely along the longitudinal direction of the light-emitting part of the discharge vessel. The antenna may be configured as an active or a passive antenna. Particularly preferably, the antenna is a passive antenna, which means that it is not directly electrically connected to any of the electrodes. Instead, the antenna is capacitively or resistively coupled to the electrodes, as already generally described in EP 2 301 063 B1 mentioned at the beginning. According to the invention, the antenna is preferably coupled to the electrodes via a capacitor unit. In particular, the antenna on the side of the first electrode is capacitively coupled to the lamp ignition voltage via a capacitor unit, especially a triple capacitor such as the applicant's "Triple Capacitor". For example, the capacitor unit comprises an inner conductor, in particular a niobium pin, surrounded by a dielectric, in particular a ceramic tube. An outer conductor is arranged around the outer surface of the dielectric as a coil, for example a coil of tungsten wire. The inner conductor is electrically conductively connected to the electrode, in particular the first electrode. The outer conductor, in turn, is electrically conductively connected to the antenna. In a triple capacitor, this structure of inner conductor, dielectric and outer conductor is implemented threefold and connected in parallel to each other. The capacitor unit causes the high-frequency ignition pulse to be transmitted only at an attenuated level. The capacitance of the capacitor, and thus the desired ignition pulse, can be adjusted by suitably matching the dimensions of the dielectric, specifically the thickness of the material, the coil and the pin. In this manner, the ignition voltage to start the lamp is lowered and the formation of the electric arc is assisted without the possibility of current flow through the antenna, which would bypass the electric arc and could even damage or destroy the material of the discharge vessel.

For attaching the antenna to the discharge vessel and/or for coupling the antenna to the ignition voltage, the antenna has a so-called antenna ring at least on the side of the first electrode and preferably on both its sides. Said antenna ring seamlessly adjoins the main body of the antenna extending in the longitudinal direction of the discharge vessel and is preferably made of the same material as the main body, and, in particular, is integral with the latter. The antenna ring preferably completely surrounds the discharge vessel in its circumferential direction. A first antenna ring is advantageously arranged in the region of the first electrode and thus also surrounds the first electrode in the circumferential direction, and preferably in a plane perpendicular to the longitudinal direction of the lamp. Therefore, to place the protrusion as close as possible to the antenna, it is sufficient to position the electrode in the correct axial position along the longitudinal direction of the lamp. Due to the antenna ring, the distance between the protrusion and the antenna does not change, for example, upon rotation of the electrode together with the protrusion about a central longitudinal axis of the lamp. The corresponding antenna ring therefore ensures simplified assembly and reliable operation of the high-pressure discharge lamp according to the invention. As mentioned earlier, when the free end of the protrusion is as close as possible to the antenna, and here specifically to the antenna ring located on the outer wall of the discharge vessel, the distance between the two essentially corresponds to the wall thickness of the discharge vessel. Taking into account usual wall thicknesses of a discharge vessel of the burner unit of a conventional high-pressure discharge lamp, and in particular a high-pressure sodium-vapor discharge lamp, typical distances in the radial direction, perpendicular to the direction of longitudinal extent of the electrode support, between the antenna ring and the free end of the protrusion of the first electrode are in a range from 0.65 mm to 0.9 mm, preferably from 0.65 mm to 0.75 mm.

To keep the distance between the free end of the protrusion and the antenna ring as small as possible, it is not only necessary to bring the protrusion close to the antenna ring in a radial direction with respect to the electrode support but also to match the axial positions of the antenna ring and the protrusion along the longitudinal direction of the electrode support. However, it is usually not necessary for the axial positions to match exactly in order to achieve an improvement in the ignitability of the lamp. Tests have shown that it is sufficient if the first antenna ring adjacent to the first electrode is arranged in a region whose width in a longitudinal direction of the lamp passing through the electrode supports is in a range of up to ±4 mm in relation to the free end of the protrusion. The deviation of the antenna ring in the axial direction with respect to the free end of the protrusion may therefore be up to 4 mm both in the direction toward and away from the electrode tip, resulting in a strip having a width of 8 mm in which the protrusion of the first electrode can be positioned. This tolerance range greatly facilitates the assembly of the lamp according to the invention. Preferably, the range is up to ±3 mm and in particular at most ±2 mm.

So far, the above description has essentially discussed the configuration of the first electrode. In order to achieve the improvement in ignitability intended by the invention, it is sufficient if only one of the electrodes, referred to herein as the first electrode, has the protrusion protruding beyond the electrode coil. In principle, it would therefore be possible to use a conventional electrode as the second electrode, i.e. an electrode without a protrusion. Preferably, however, the second electrode is configured like the first electrode. In this manner, manufacturing and assembly are simplified, as no distinction between the two electrodes is required. In this case, therefore, the second electrode likewise has a protrusion, which, however, does not necessarily have to contribute to improving ignitability.

Moreover, a second antenna ring may be provided which is integral with the other sections of the antenna and is formed by routing the antenna around the outer circumference of the discharge vessel at a distance from the first antenna ring. The second antenna ring is configured in particular like the first antenna ring. To avoid repetition, reference is made to the discussion of the first antenna ring. The second antenna ring may be arranged in the region of the second electrode. The relative positioning of the second antenna ring with respect to the second electrode and, in particular, a protrusion on the second electrode may be as between the first antenna ring and the first electrode. For example, the second antenna ring may be arranged along the longitudinal direction of the lamp at essentially the same level as a protrusion on the second electrode. In this case, the distance between the protrusion of the second electrode and the antenna is essentially as small as that between the first electrode and the first antenna.

As mentioned at the beginning, the ignition voltage is preferably applied to the second electrode, while the first electrode is preferably connected to the neutral conductor. To prevent a short circuit that would render the ignition aid ineffective, it makes sense to ensure that the voltage breakdown only occurs on the side of the first electrode. This can be achieved by increasing the distance between the protrusion of the second electrode and the antenna to such an extent that coupling no longer occurs there. Accordingly, the distance between the second electrode, and in particular the protrusion of the second electrode, and the antenna is greater than the corresponding distance between the protrusion of the first electrode and the antenna. Specifically, this can be done by arranging the second antenna ring at a comparatively large distance from the electrode coil and, in particular, from the protrusion of the second electrode. In particular, the second antenna ring is placed further outward for this purpose compared to the first antenna ring and is arranged in the region of the outer end of the discharge vessel adjacent to the second electrode. It is preferred that the second antenna ring is offset along the longitudinal direction of the lamp by at least 2 mm, preferably by at least 4 mm, and particularly preferably by at least 6 mm, relative to the protrusion of the second electrode, in particular offset toward the end of the discharge vessel. This ensures that the ignition is performed properly and without a short circuit and that an electric arc is created between the two electrodes.

As already mentioned several times, the structure of the high-pressure discharge lamp according to the invention corresponds to that known from the prior art, except for the electrode configuration according to the invention. This applies in particular to the basic structure of the lamp and the materials used. For example, the discharge vessel of the burner unit of the high-pressure discharge lamp is preferably made of ceramic, but may also be made of quartz glass. It typically has an inner diameter between 5 and 15 mm, preferably between 8 mm and 10 mm. The burner unit is in turn arranged in an outer bulb, which is preferably made of quartz glass. The outer bulb may be socketed on one or both sides. The high-pressure discharge lamp according to the invention is preferably configured for use in conventional lamp sockets and in particular also with conventional ballasts. It is preferably configured for plant lighting, especially for horticulture, for example, use in greenhouses.

BRIEF DESCRIPTION OF THE DRAWINGS

The invention is explained in more detail below with reference to embodiment examples shown in the figures, without limiting the invention to these embodiment examples. Like parts or functionally like parts are designated by like reference numerals in the figures. Recurring parts are not designated separately in each figure. In the schematic figures.

DETAILED DESCRIPTION

Figure 1:
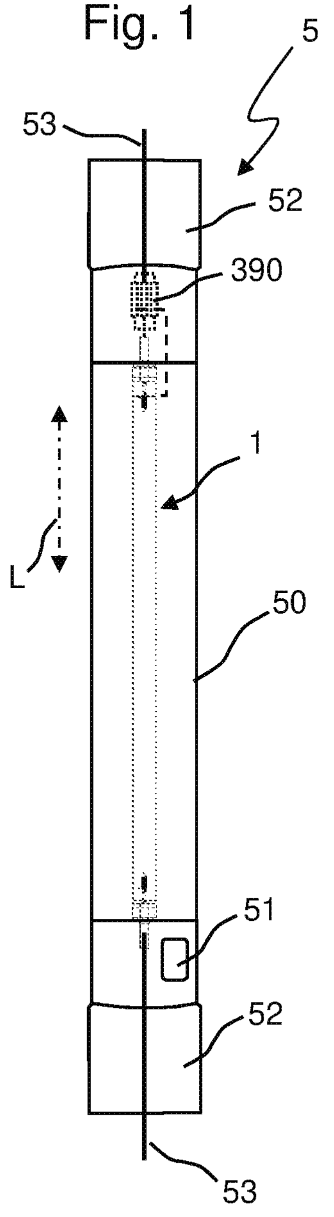
FIG. 1: is a side view of a high-pressure discharge lamp according to the invention.

FIG. 1 shows a high-pressure discharge lamp 5, specifically a high-pressure sodium-vapor discharge lamp for plant lighting. The high-pressure discharge lamp 5 comprises an outer bulb 50, which is made of quartz glass, for example, and in which a burner unit 1 is accommodated. As is usual with high-pressure discharge lamps 5, the outer bulb 50 comprises at each end along the longitudinal direction L of the lamp a seal 52, for example a pinch, which seals the outer bulb 50 in a gas-tight manner and through which outer connections 53 for electrically connecting the high-pressure discharge lamp 5 are routed to the outside. Furthermore, a getter 51 is arranged in the outer bulb 50 to remove impurities in the outer bulb 50.

Figure 2:
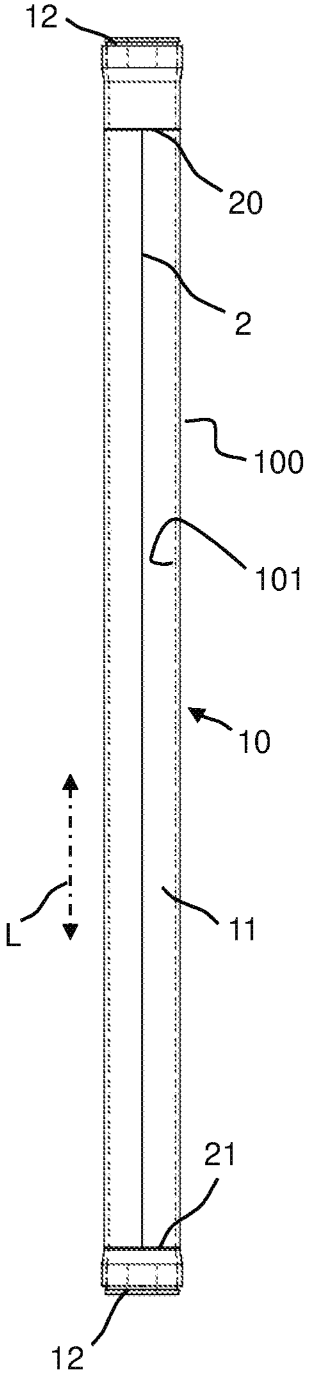
FIG. 2: is a side view of the discharge vessel of the high-pressure discharge lamp of FIG. 1.
Figure 3:
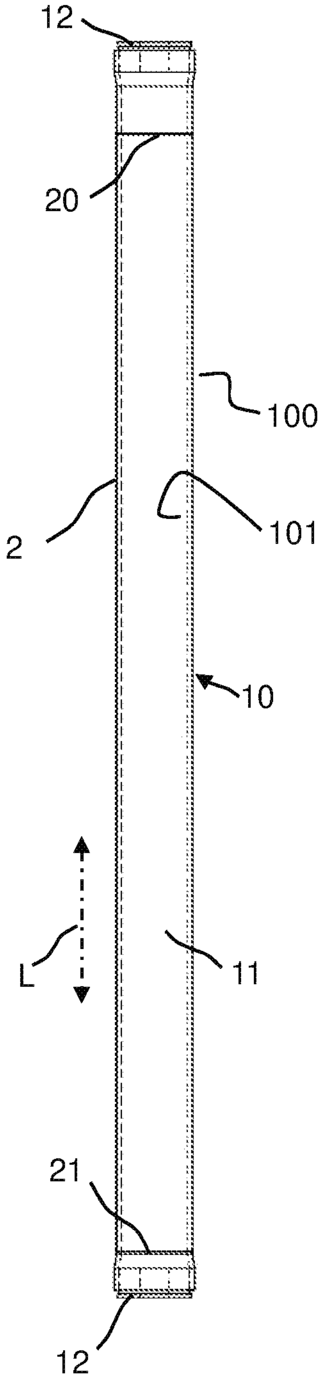
FIG. 3: shows the discharge vessel according to FIG. 2 rotated by 90°.

The burner unit 1 comprises a discharge vessel 10 made, for example, of ceramic, which is shown in more detail in FIGS. 2 and 3. The view in FIG. 2 is rotated 90° to the left compared to the view in FIG. 3. The discharge vessel 10 is essentially configured as a hollow cylinder and encloses a discharge space 11, which is closed in a gas-tight manner at each of its end faces by a seal 12, which in turn each have a lead-through for an electrode connection. The wall of the discharge vessel 10, which is made of a ceramic, for example, has an outer surface 100 and an inner surface 101, which are spaced apart from one another by the wall thickness of the discharge vessel 10. An antenna 2 is arranged on the outer surface 100 of the discharge vessel 10. The antenna 2 is made of a conductive material applied to the outer surface 100 of the discharge vessel 10, and its main body extends in the longitudinal direction L of the high-pressure discharge lamp 5. In the region of the ends of the discharge vessel 10, the antenna has a first antenna ring 20 and a second antenna ring 21 made of conductive material. The antenna 2 including the antenna rings 20, 21 is integral, so that the antenna rings 20, 21 are electrically conductively connected to each other. Such antennas 2 are generally known in the prior art. However, as will be discussed in more detail below, in the present embodiment, the first antenna ring 20 is positioned farther from the adjacent end of the discharge vessel 10 and toward the center of the discharge vessel than the second antenna ring 21 is positioned from its associated end of the discharge vessel 10. This will be explained in more detail below.

Figure 4:
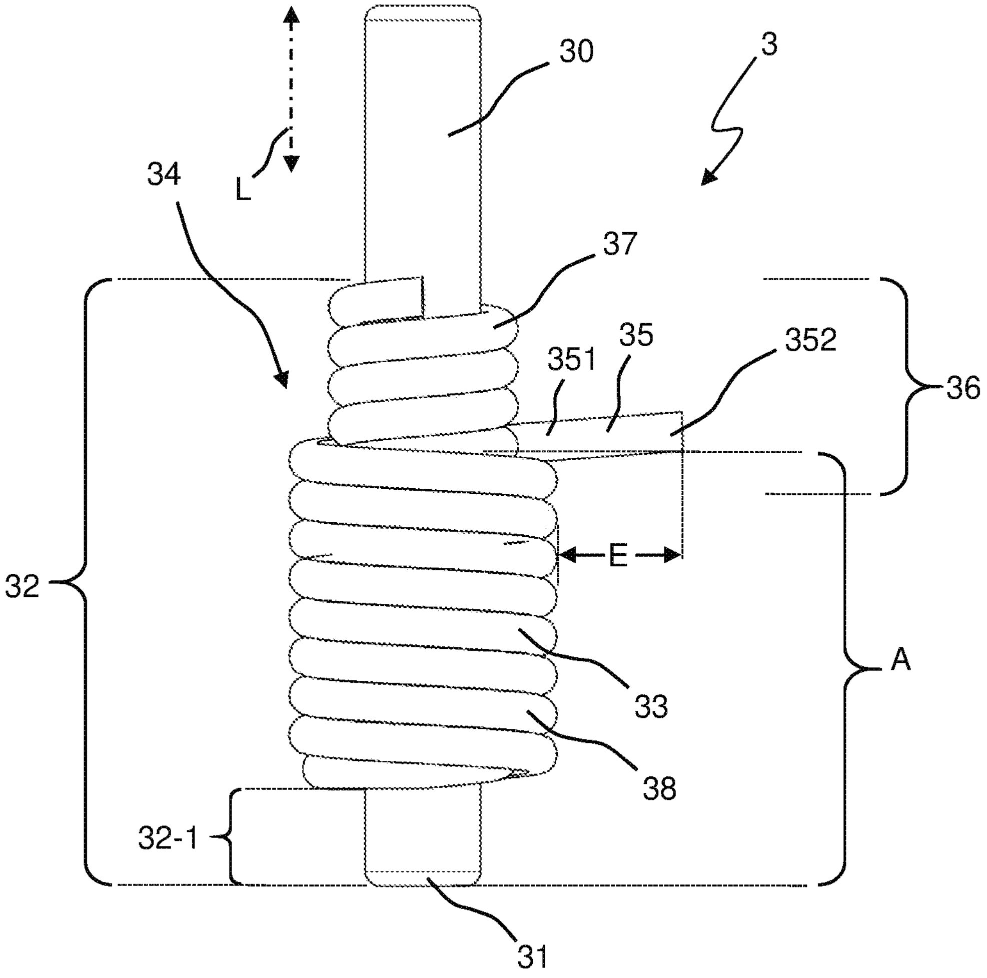
FIG. 4: is a detailed side view of the first electrode.

FIG. 4 shows an electrode using the first electrode 3 as an example. The second electrode 4 (see FIGS. 7 and 8) may be configured in the same manner as the first electrode 3. The first electrode 3 comprises an electrode support 30 with an electrode tip 31. Specifically, the electrode support 30 is an integral rod with one end forming the electrode tip 31. A wire 33 is wound onto the electrode support 30 in a tip region 32 as an electrode coil 34. Both the electrode support 30 and the wire 33 forming the electrode coil 34 are made of tungsten, for example. In this case, the electrode coil 34 consists of a continuous, integral wire 33 which, in the embodiment example shown, is wound around the electrode support 30 in two coil layers 37,38. Specifically, the wire 33 forms an inner coil layer 37, which in the embodiment example shown consists of twelve turns wound from a middle region of the electrode support 30 toward the electrode tip 31 with a clockwise direction of rotation, and an outer coil layer 38 counter-directionally wound onto the inner coil layer 37 back from the electrode tip, which in the embodiment example shown consists of nine turns with a counter-clockwise direction of rotation. However, the directions of rotation could also be reversed. The tip region 32, in which the electrode coil 34 is located, extends from the electrode tip 31 toward the rear end of the electrode support 30 and occupies about two-thirds of the total length of the electrode support. The electrode coil 34 is set back relative to the electrode tip 31, so that in a free tip region 32-1, an end region of the electrode support 30 is exposed and is not wrapped by the electrode coil.

In order to ensure a uniform arc discharge within the burner unit 1, it is desired for the electric arc to continuously attach to the electrode tip 31 during operation of the high-pressure discharge lamp 5. If this is not the case, the lamp flickers during operation. For this reason, the electrode coil is usually slightly set back on the electrode support relative to the electrode tip. Furthermore, it is avoided in the prior art to have protrusions that protrude beyond the electrode coil 34, as they can cause the electric arc to attach to them instead of the electrode tip 31. Contrary to this previous effort, a protrusion 35 is provided on electrode 3, which protrudes by a length E beyond the electrode coil 34. The length E is measured as the distance of the outermost point of the protrusion 35 from the outer circumference of the electrode coil 34 indicated by the dashed line, measured in a radial direction, starting from the center axis of the electrode support 30 (see also FIG. 5). In the embodiment shown, the protrusion 35 is formed by the end section 351 of the wire 33 of the outer coil layer 38. In other words, a piece of wire 33 is left protruding outward after the outer coil layer 38 of the electrode coil 34 has been created from it. This piece of wire 33 is not wound around the electrode support 30 and onto the inner coil layer 37, and therefore its free end 352 protrudes from the electrode coil 34.

The protrusion 35 reduces the distance between the electrode 3 and the antenna 2 by the length E of the protrusion 35, measured in the radial direction R, starting from the center axis M of the electrode support 30, between the outer circumference of the electrode coil 34 and the outermost point of the protrusion 35. In this case, the length E is greater than the diameter (thickness) C of the electrode coil 34 in the radial direction R. The closer proximity of the electrode 3 to the antenna facilitates the escape of electrons, which in turn improves the ignitability of the high-pressure discharge lamp 5. To prevent the electric arc from attaching to the protrusion 35 during operation of the high-pressure discharge lamp 5, the protrusion 35 is spaced apart from the electrode tip 31 by a distance A in the longitudinal direction L of the high-pressure discharge lamp 5. Although the protrusion 35 is still in the tip region 32, in the region of the electrode coil 34, but is located in a middle region of the electrode support 30, i.e. at about half its length. With respect to the electrode coil 34, the protrusion 35 is located in a rear end region 36 thereof, at about one-third of the total length of the electrode coil in the longitudinal direction L, and at the end of the outer coil layer 38 facing away from the electrode tip 31. Such an arrangement of the protrusion 35 reliably prevents the electric arc from attaching to it.

Figure 5:
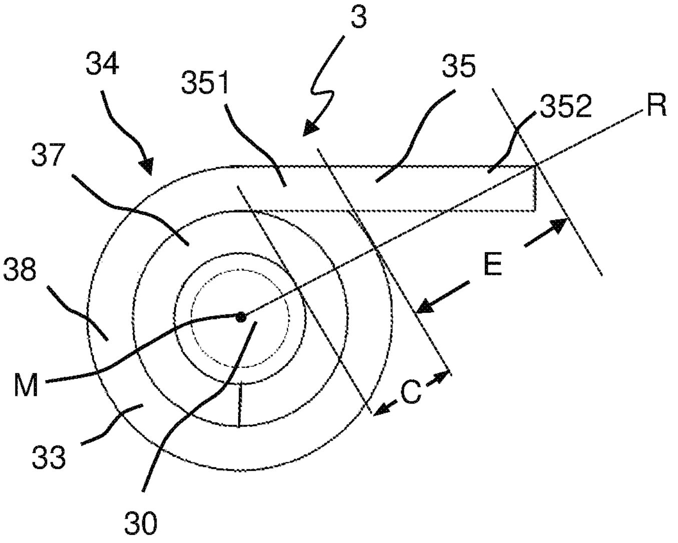
FIG. 5: is a view of the first electrode in an axial direction, with one end of the wire forming the protrusion.
Figure 6:
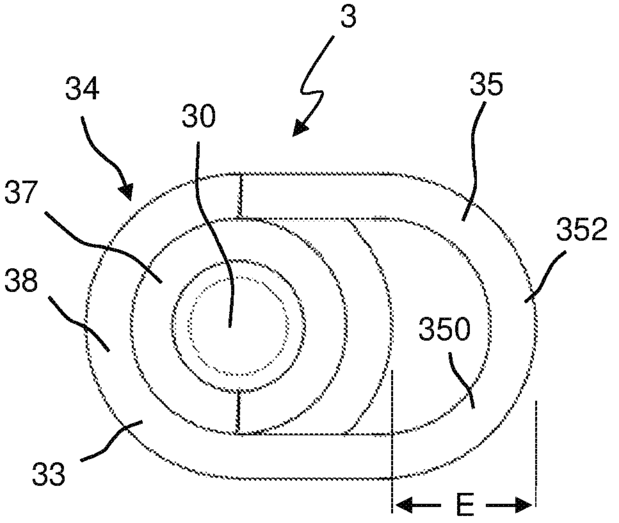
FIG. 6: is a view of the first electrode in an axial direction, with a wire loop forming the protrusion.

FIGS. 5 and 6 show two different embodiments of the protrusion 35 in an axial view of the electrode 3. In the embodiment shown in FIG. 5, the protrusion 35 is formed by an end section 351 of the wire 33, the free end 352 of which projects away from the electrode coil 34 and the electrode support 30. With respect to the electrode support 30 or the inner coil layer 37, the protrusion 35 projects tangentially. In the radial direction, it shortens the distance between the electrode 3 and the antenna 2 by the length E, as already described with reference to FIG. 4. FIG. 6 shows an alternative embodiment in which the protrusion 35 is formed by a wire loop 350 of the wire 33. Specifically, a middle section of the wire 33 is formed into a wire loop 350 away from and back to the inner coil layer 37. In the embodiment example shown, the wire 33 then ends after returning to the inner coil layer 37. However, it could also be further wound in further turns around the inner coil layer 37. It is also possible to squeeze the wire loop together such that the two halves of the loop are closer together or even touching. It is also possible to twist the two halves of the loop together to make the loop narrower and tapered in the region of the free end. The loop-shaped protrusion 35 likewise projects radially beyond the electrode 3 by the length E, thereby shortening the distance between the electrode 3 and the antenna 2.

Figure 7:
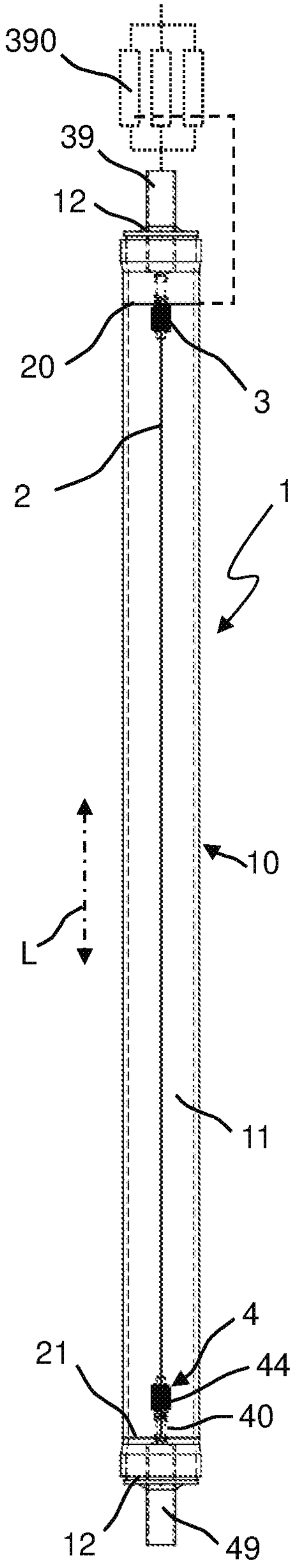
FIG. 7: is a side view of the burner unit of a high-pressure discharge lamp.
Figure 8:
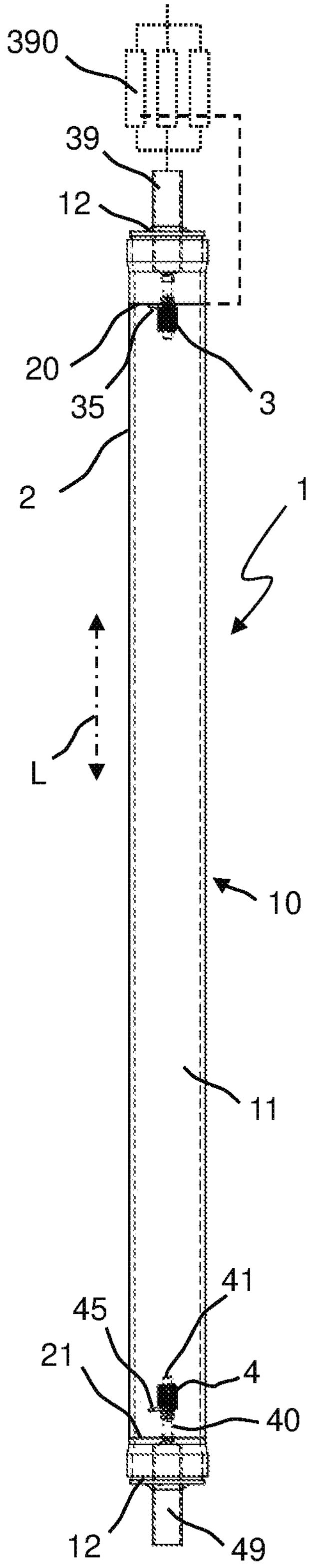
FIG. 8: shows the burner unit according to FIG. 4 rotated by 90°.

FIGS. 7 and 8 show the burner unit 1 with the electrodes 3, 4 installed in the discharge vessel 10. As with FIGS. 2 and 3, the discharge vessel 10 is shown rotated by 90° between FIGS. 7 and 8. The electrodes 3, 4 are configured identically, are arranged in the discharge space 11 of the burner unit 1 and can each be electrically contacted with a contact pin 39, 49, which is led out of the discharge vessel 10 through the seal 12. As can be seen in FIGS. 7 and 8, the first antenna ring 20 of the antenna 2 is arranged along the longitudinal direction L of the high-pressure discharge lamp 5 at the level of the protrusion 35 of the first electrode 3. The second antenna ring 21 of the antenna 2, on the other hand, is spaced apart from the protrusion 45 of the second electrode 4 along the longitudinal direction L of the high-pressure discharge lamp 5 and is arranged offset outwardly toward the end of the discharge vessel 10 adjacent to the second electrode 4. In this manner, coupling between the second antenna ring 21 and the second electrode 4 is avoided, and short circuits are prevented.

The first electrode 3 is configured to be connected to the neutral conductor of a ballast. Furthermore, a capacitor unit 390, in the present embodiment a triple capacitor such as the applicant's "Triple Capacitor", is provided on the side of the electrode 3. Via the capacitor unit 390, the antenna 2 is capacitively coupled to the ignition voltage on the side of the first electrode 3. The capacitor unit is configured as a triple capacitor and comprises three capacitor elements connected in parallel to each other, each with an inner conductor, a dielectric and an outer conductor. For example, the inner conductor is a niobium pin surrounded by a ceramic tube that forms the dielectric. Around the outer surface of the dielectric, the outer conductor is arranged as a coil, for example made of tungsten wire. The inner conductor is electrically conductively connected to the first electrode. The outer conductor, in turn, is electrically conductively connected to the antenna. The capacitor unit causes the high-frequency ignition pulse to be transmitted only at an attenuated level. The capacitance of the capacitor, and thus the desired ignition pulse, can be adjusted by suitably matching the dimensions of the dielectric, specifically the wall thickness of the ceramic tube, the coil and the pin. In this manner, the ignition voltage to start the lamp is lowered and the formation of the electric arc is assisted without the possibility of current flow through the antenna, which would bypass the electric arc and could damage or destroy the material of the discharge vessel.

The use of the capacitor unit 390 in conjunction with the antenna 2 and the protrusion 35 results overall in a significant improvement in the ignitability of the high-pressure discharge lamp 5, allowing its operation at increased gas filling pressure.

Figure 9:
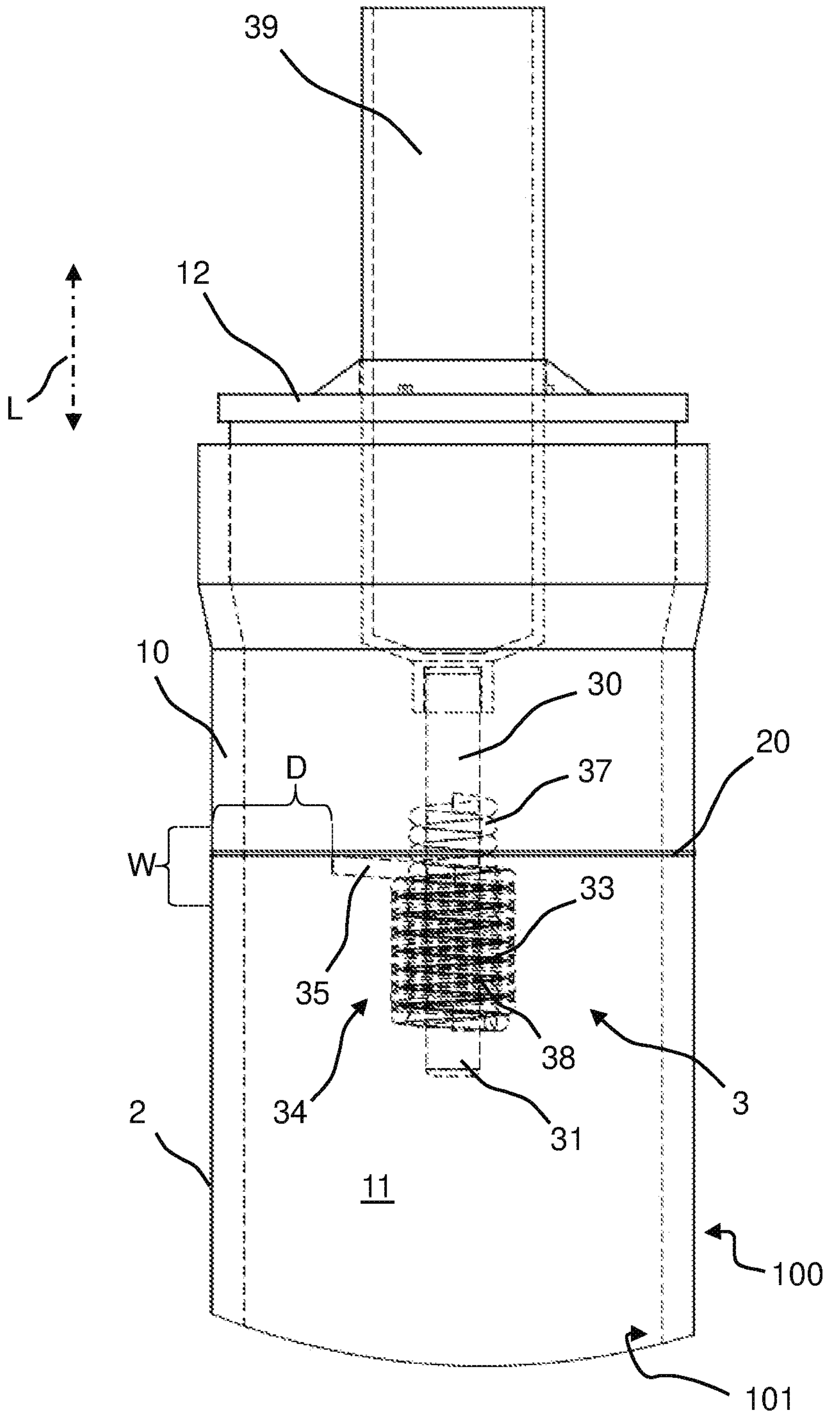
FIG. 9: is a detailed side view of an end section of the burner unit with the first electrode.

FIG. 9 shows an enlarged detailed view of the end of the burner unit 1 in which the first electrode 3 is arranged. In particular, it is apparent from the illustration that the first antenna ring 20 is arranged within a width W around the protrusion 35 in the longitudinal direction L of the lamp. The width W is, for example, 2 mm to each side of the protrusion 35 in the longitudinal direction L. This ensures that the protrusion 35 is as close as possible to the antenna 2, and more specifically to the first antenna ring 20. The distance D between the electrode 3 and the antenna 2 is therefore shortened by the length E of the protrusion 35. Due to this reduced distance D, the high-pressure discharge lamp 5 ignites with an ignition voltage that can be provided by conventional lamp sockets and ballasts, even with a very high gas filling pressure in the discharge vessel to achieve a high PAR value.

What is claimed is:

1. A high-pressure discharge lamp with a burner unit which has a discharge vessel which encloses a discharge space and in which two electrodes are arranged opposite one another, wherein the electrodes each have an electrode support and an electrode tip, wherein the electrode tips are located opposite one another to form an electric arc during operation of the high-pressure discharge lamp, wherein at least a first one of the electrodes is configured as a coil electrode which has an electrode support and an electrode coil formed by a wire wound around the electrode support, wherein an exposed end of the electrode support forms the electrode tip, and wherein the electrode coil is arranged in a tip region of the electrode support adjacent to the electrode tip in the discharge space, and wherein an antenna to which voltage can be applied is routed along an outer surface of the discharge vessel, wherein the first electrode has a protrusion that protrudes beyond the outer circumference of the electrode coil toward the antenna.

2. The high-pressure discharge lamp according to claim 1, wherein the lamp is selected from the group consisting of a metal halide lamp and a high-pressure sodium-vapor lamp, a high-pressure sodium-vapor lamp with a gas filling pressure of more than 360 mbar, a high-pressure sodium-vapor lamp with a gas filling pressure of more than 470 mbar, a high-pressure sodium-vapor lamp with a gas filling pressure of more than 580 mbar, a high-pressure sodium-vapor lamp with a gas filling pressure of more than 700 mbar, and a high-pressure sodium-vapor lamp with a gas filling pressure of 580 mbar to 850 mbar.

3. The high-pressure discharge lamp according to claim 1, wherein the protrusion has at least one of the following characteristics:

it is located at a rear end region of the electrode coil facing away from the electrode tip;

it is formed from a section of the wire of the electrode coil;

it is formed as a wire loop;

it is formed by an end section of the wire that is not wound around the electrode support;

it protrudes from an outer coil layer, which is wound onto an inner coil layer at least in some sections;

it protrudes beyond the outer circumference of the electrode coil by a length in the range of 0.5 mm to 1.8 mm;

the free end of the protrusion is arranged close to the inner surface of the discharge vessel, but keeps a distance from it.

4. The high-pressure discharge lamp according to claim 1, wherein the antenna has at least one of the following characteristics:

it is configured as a passive antenna not directly electrically connected to the electrodes;

it is capacitively or resistively coupled to the electrodes;

it is capacitively coupled to a lamp ignition voltage on the side of the first electrode via a capacitor unit, in particular a triple capacitor;

it has a first antenna ring integral with the other sections of the antenna and formed by routing the antenna around the outer circumference of the discharge vessel in the region of the first electrode.

5. The high-pressure discharge lamp according to claim 4, wherein the first antenna ring is arranged in a region whose width in a longitudinal direction of the lamp extending through the electrode supports is in a range of at most ±4 mm with respect to the free end of the protrusion.

6. The high-pressure discharge lamp according to claim 4, wherein the distance in a radial direction between the first antenna ring and the free end of the protrusion essentially corresponds to the wall thickness of the discharge vessel.

7. The high-pressure discharge lamp according to claim 6, wherein the distance in the radial direction between the first antenna ring and the free end of the protrusion is in a range of 0.65 mm to 0.9 mm.

8. The high-pressure discharge lamp according to claim 1, wherein the second electrode is configured like the first electrode.

9. The high-pressure discharge lamp according to claim 1, wherein a second antenna ring is provided which is integral with the other sections of the antenna and is formed by routing the antenna around the outer circumference of the discharge vessel at a distance from the first antenna ring.

10. The high-pressure discharge lamp according to claim 9, wherein the second antenna ring is arranged at a distance from the electrode coil of the second electrode and in the region of the outer end of the discharge vessel adjacent to the second electrode.

11. The high-pressure discharge lamp according to claim 1, having at least one of the following characteristics:

the discharge vessel is made of ceramic;

the discharge vessel is arranged in an outer bulb, the outer bulb being socketed either at one or both ends;

it is configured for plant lighting.

12. A high-pressure sodium-vapor discharge lamp with a burner unit which has a discharge vessel which encloses a discharge space and in which two electrodes are arranged opposite one another, wherein the electrodes each have an electrode support and an electrode tip, wherein the electrode tips are located opposite one another to form an electric arc during operation of the high-pressure discharge lamp, wherein at least a first one of the electrodes is configured as a coil electrode which has an electrode support and an electrode coil formed by a wire wound around the electrode support, wherein an exposed end of the electrode support forms the electrode tip, and wherein the electrode coil is arranged in a tip region of the electrode support adjacent to the electrode tip in the discharge space, and wherein an antenna to which voltage can be applied is routed along an outer surface of the discharge vessel, wherein the first electrode has a protrusion that protrudes beyond the outer circumference of the electrode coil toward the antenna, wherein the protrusion it is located at a rear end region of the electrode coil facing away from the electrode tip and is formed from a section of the wire of the electrode coil.

* * * * *